June 10, 1958 G. W. COX 2,837,896
HYDRAULIC OR PNEUMATIC BI-DIRECTIONAL IMPULSE MOTOR
Filed April 22, 1955 4 Sheets-Sheet 1

INVENTOR:
George W. Cox
His Patent Attorney.

June 10, 1958  G. W. COX  2,837,896
HYDRAULIC OR PNEUMATIC BI-DIRECTIONAL IMPULSE MOTOR
Filed April 22, 1955  4 Sheets-Sheet 2

INVENTOR:
George W. Cox
His Patent Attorney

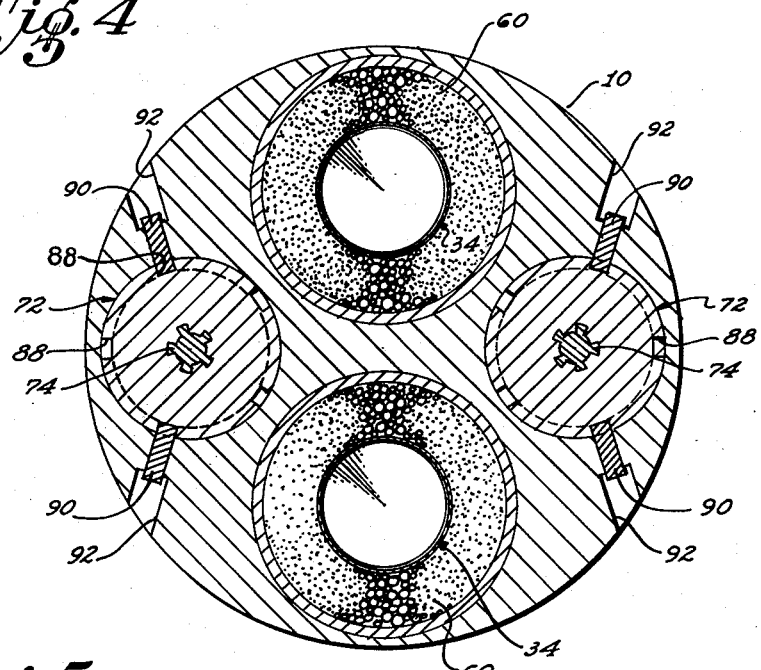
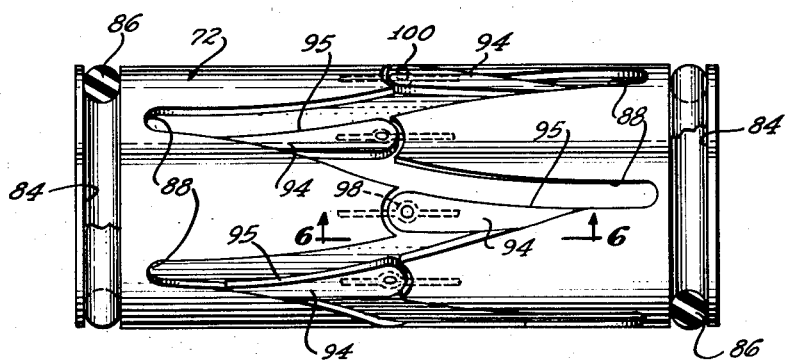
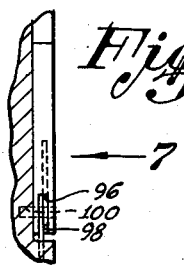 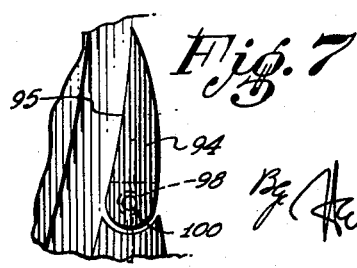

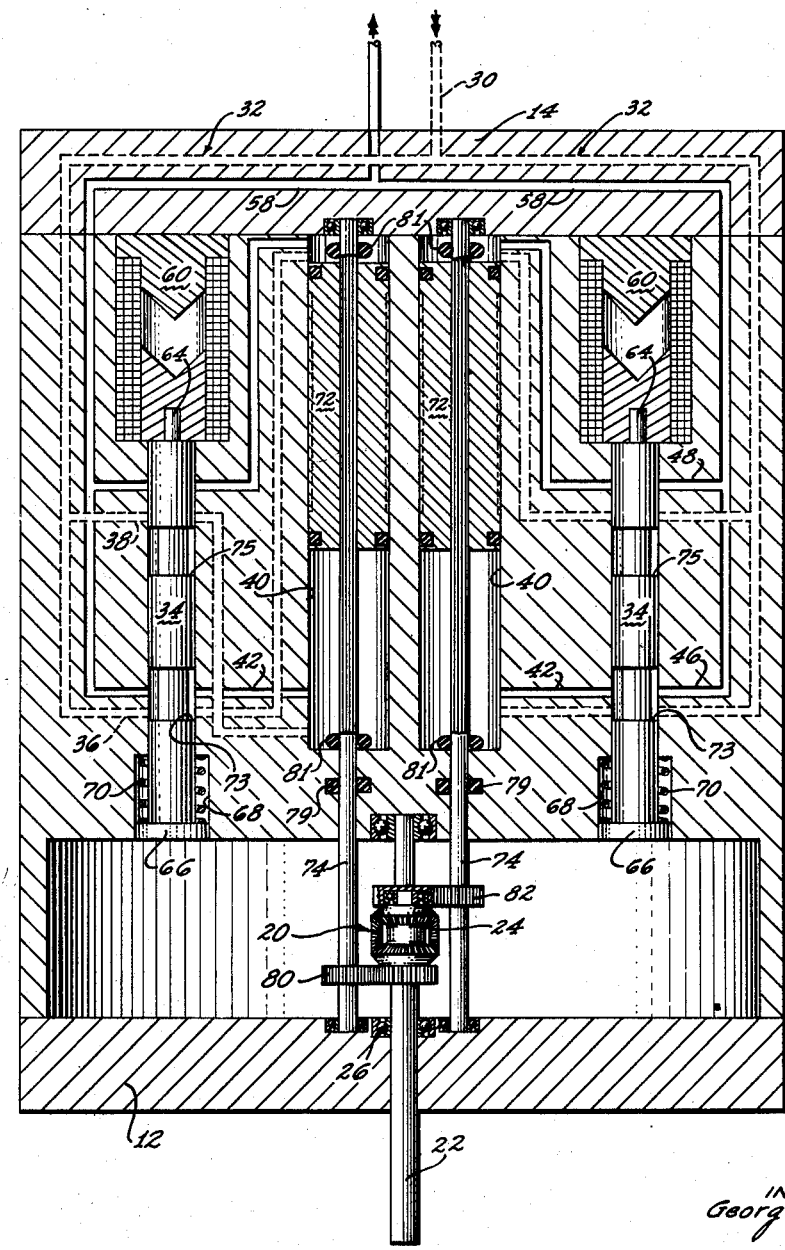

United States Patent Office 2,837,896
Patented June 10, 1958

2,837,896

HYDRAULIC OR PNEUMATIC BI-DIRECTIONAL IMPULSE MOTOR

George W. Cox, Los Angeles, Calif., assignor to Northrop Aircraft, Inc., Hawthorne, Calif., a corporation of California Application April 22, 1955, Serial No. 503,147

3 Claims. (Cl. 60—97)

The present invention relates to electrical and hydraulic or pneumatic equipment and more particularly described as a hydraulic or pneumatic bi-directional impulse motor.

Many impulse motors require and provide structure which may be rotated very accurately a defined distance for each electrical pulse transmitted thereto and preferably is adapted to be rotated in one direction or the other or alternately in one direction and then the other depending on the manner in which the electrical pulses are transmitted to the device.

Impulse motors are used to control accurately functioning mechanisms such as computing devices, electrical relay systems that may be found in communication equipment, servo systems and similar applicable structure.

Devices of the kind to which this invention relates should also be so constructed that they may be readily incorporated in place of other previously used devices in a wide variety of equipment and should be readily adapted to the special needs of whatever type of equipment the device is to be used. In addition the impulse motor should be capable of operating on the electrical and hydraulic or pneumatic power provided therefor.

The principal object of this invention is to provide an electrical pulse, hydraulic or pneumatic impulse motor which can be operated very accurately for an extended period of time without missing any pulses or lagging in operation.

Another object of this invention is to provide an electrical pulse, hydraulic or pneumatic impulse motor capable of use in a variety of equipment, which may be readily actuated in one or the other directions or alternately in one direction and then the other or in any combination thereof.

Figure 4 is a transverse, cross-sectional view taken on line 4—4 of Figure 1 looking in the direction indicated and illustrating the relative positions of the electrical solenoids and pistons.

Figure 5 is a fragmentary, perspective view illustrating details of a reciprocable piston.

Figure 6 is a cross-sectional, fragmentary view taken on line 6—6 of Figure 5 looking in the direction indicated and illustrating in side elevation a locking or stop gate.

Figure 7 is a fragmentary, plan view taken on Figure 6 looking in the direction indicated by the arrow identified by the numeral 7.

Figure 8 is a view of the valves, and pistons and their relationship to a schematic illustration of a conduit and porting system.

Figure 1:
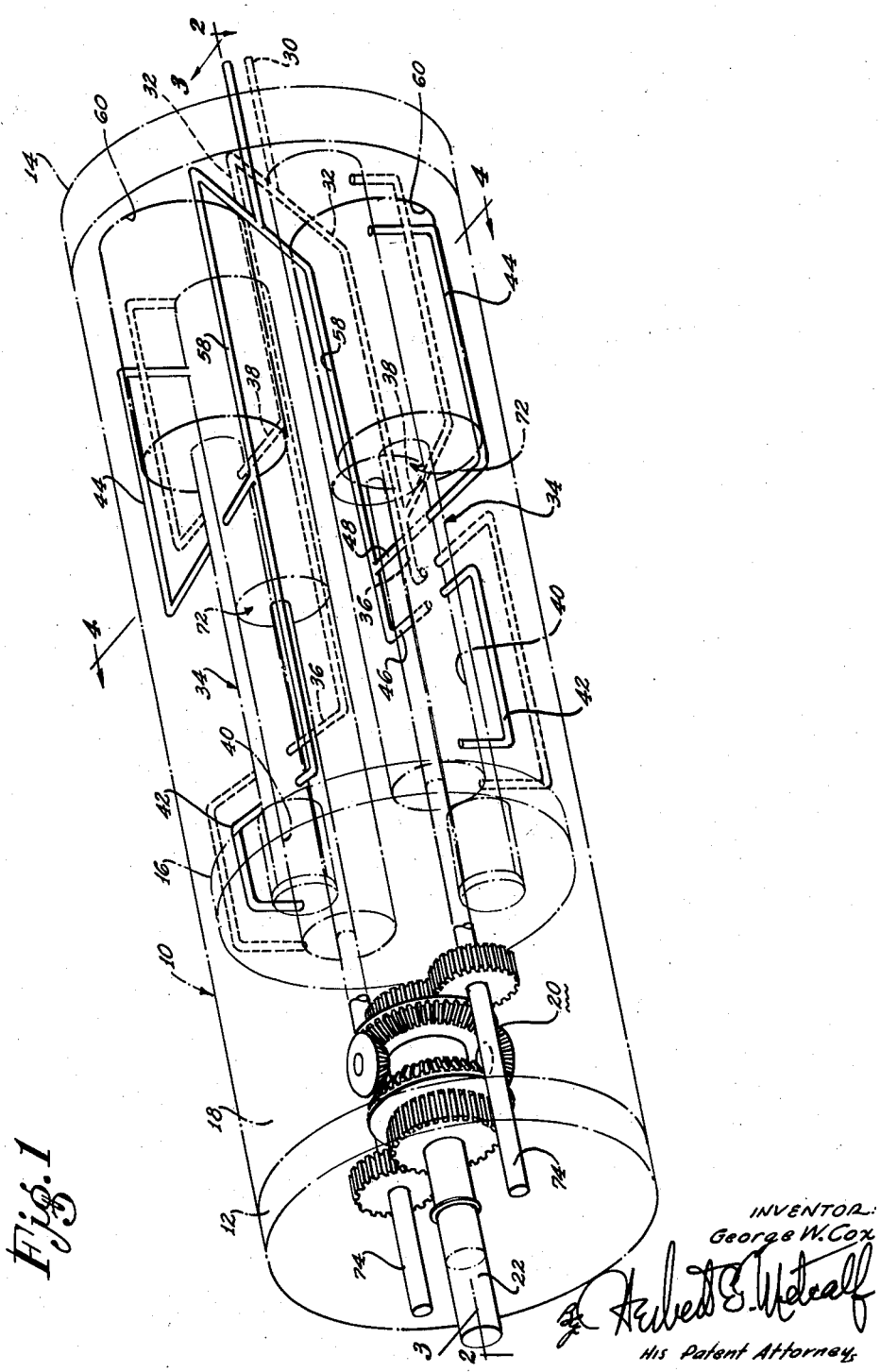
Figure 1 is a perspective view schematically illustrating by solid and dotted lines the hydraulic or pneumatic porting or conduit system.

It is to be understood that the impulse motor may be either pneumatically or hydraulically actuated.

Referring to the drawings for a more detailed description of the present invention, 10 designates an elongated, cylindrical body, having end caps or covers 12 and 14 attached thereto.

The body 10 has a partition 16 that in combination with the body and cap 12 defines a compartment 18. Disposed in compartment 18 is a conventional differential 20. A rotatable driven shaft 22 extends through end cap 12, differential 20 and is supported in the latter by roller bearing 24. Further, shaft 22 is supported in end cap 12 and partition 16 by roller bearings 26 and 28 respectively.

Attention is directed to Figure 1 and the hydraulic porting or conduit system. The dotted line structure indicates the inlet system and the solid line structure designates the outlet or exhaust system.

The hydraulic fluid enters the body 10 through inlet 30 and branches therefrom in two directions. One branch of the system and the structure in one side of the body is identical to the other; therefore only one of each will be described. The fluid is conducted and directed from inlet 30 through line 32 to a slide valve broadly designated 34. Depending on the position of the slide valve 34 the fluid passes through conduit 36 and 38 to either of two ends of a cylinder 40. Each of the conduits 36 and 38 terminates in cylinder 40 adjacent partition 16 or end cap 14 respectively. Again depending on the position of the slide valve 34, fluid is conducted from cylinder 40 through line 42 or 44 back past the slide valve 34 into conduit 46 or 48 and out exhaust or outlet 58. Each of the outlet lines 42 and 44 has its opening in cylinder 40 spaced from partition 16 or end cap 14 in order to provide a cushion for the piston hereinafter referred to in more detail. The operation of the porting or conduit system will subsequently be referred to in more detail.

Disposed in body 10, in opposed relation to compartment 18, are a pair of identical plunger type solenoids 60. Secured to each plunger 62, of the solenoids, by an extension 64 is the elongated slide valve 34.

Integral with the slide valve 34, and on the free end thereof is an enlargement or disc 66. Disposed in a chamber 68, circumscribing a portion of said slide valve 34, bearing against enlargement 66 and body 10 is a compression spring 70. Formed intermediate the ends of the slide valve 34, in a spaced apart relationship, are a pair of annular grooves 73 and 75. When the solenoids 60 are electrically energized, the plunger 62, under the impetus of created magnetic force, is pulled toward the cap 14 along with the slide valve 34. De-energizing the solenoid 60 results in the spring 70 urging the slide valve 34 and plunger 60 toward cap 12.

Reciprocably and rotatably disposed in each cylinder 40 is a piston broadly designated 72.

Extending through a bore in the piston 72 is a partially fluted, or serrated, elongated and rotatable shaft 74. Piston 72 is slidable but not rotatable on shaft 74. A roller bearing 76 in cap 14 supports a fluted end of the shaft 74 and another roller bearing 78 in cap 12 supports the opposed end. The shaft 74 extends through an opening in partition 16; the latter has a sealing ring 79 therein. Secured to one shaft 74 adjacent bearing 78 is a gear 80 that meshes with a gear on the differential to rotate the latter in one direction, and secured to the other shaft 74, adjacent sealing ring 79 is a similar gear 82 that causes the differential 20 to rotate in the opposite direction. Disposed on each end of that portion of the shaft 74 located in cylinder 40 is a rubber bumper ring or shock absorber 81.

Attention is directed to the piston 72 and Figures 4 to 7 inclusive of the drawings. Each end of piston 72 has an annular groove 84 therein that receives an O-ring 86. Formed in the sides of the piston 72 are a plurality of intersecting or inter-communicating grooves 88. Each piston 72 is rotatably controlled by a pair of guides 90 that are inserted into the grooves through openings 92 formed in the body 10. The groove configuration of each piston is identical. However the grooves of one piston arcuately curve in a direction opposite to the grooves in the other.

Also constructed and retained in the side of piston 72, adjacent the point of intersection of each of two grooves is a pivotal, spring loaded gate 94. One side 95 of the gate 94 is complementary to the configuration of the grooves 88. In other words side 95 functions as a wall of one of the grooves 88. The gate has a slot and opening 96 therein to receive the coil of a spring 98 and one end thereof respectively. The end of the spring 98 in opposed relation to that end retained in slot and opening 96 is retained in the piston 72. A pin 100, about which the gate 94 pivots, extends through the gate and is received by an opening in the piston 72.

Figure 2:
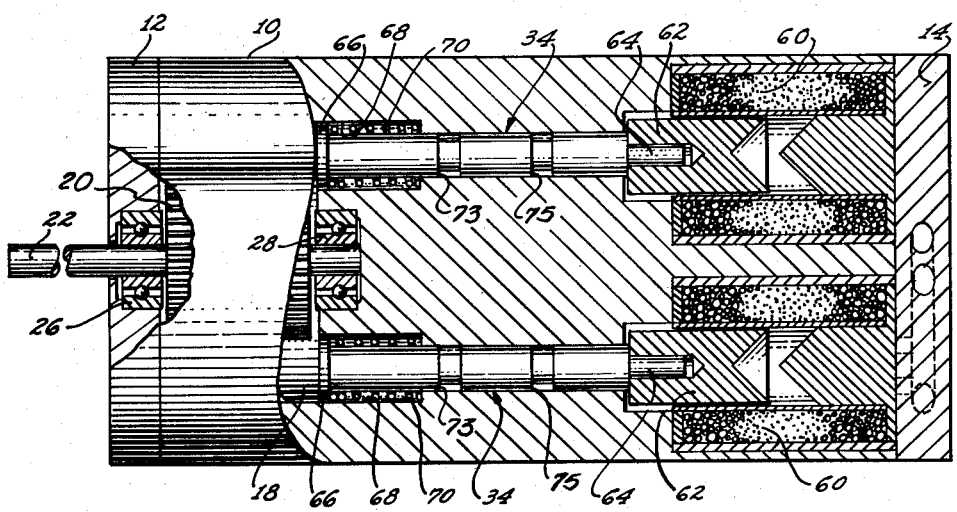
Figure 2 is a longitudinal, cross-sectional view taken on line 2—2 of Figure 1 looking in the direction indicated and illustrating the electrical solenoids and slide valves.
Figure 3:
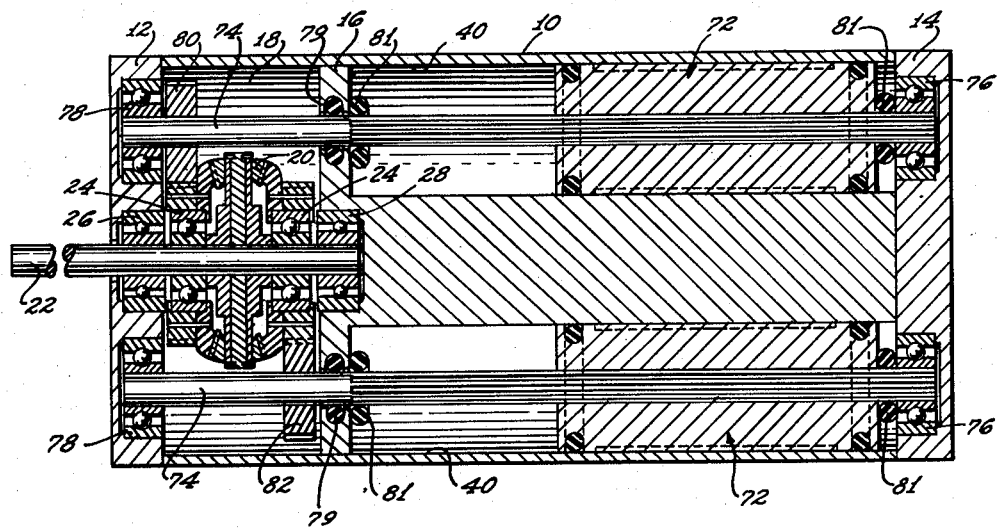
Figure 3 is a longitudinal, cross-sectional view taken on line 3—3 of Figure 1 looking in the direction indicated and illustrating the reciprocable pistons.

The operation of the invention is as follows: Assume the pistons 72 and the slide valves 34, along with the solenoids 60, to be in the positions illustrated in Figures 2 and 3 of the drawings. Also assume there to be a hydraulic pressure exerted. With the structure in the assumed position, hydraulic fluid is in the end of the cylinder 40 adjacent partition 16. This is accomplished by virtue of the fact that annular groove 73 is in a position to expose line 32 and admit fluid into the end of the cylinder 40 to urge the piston 72 to the referred to position. Further, groove 75 exposes line 44 and permits fluid to be discharged from that portion of the cylinder 40 occupied by the piston 72. The portion of the slide valve 34 between grooves 73 and 75 renders outlet line 42 closed and that portion between groove 75 and extension 64 renders inlet 33 closed.

When an electrical pulse is transmitted to solenoid 60, the magnetic force created pulls the plunger and slide valve 34 thereon toward cap 14. This results in moving annular groove 72 from the assumed position to that whereby outlet line and conduit 42 and 46 are rendered in communication with each other to permit fluid in cylinder 40 to pass therethrough to outlet 58. Further communication between inlet line 32 and conduit 36 are rendered severed by that portion of slide valve 34 between groove 73 and disc 66. Coupled with this is the fact that annular groove 75 moves from the assumed position to that of rendering in communication with each other line 33 and 38 to permit fluid to pass into cylinder 40 behind the piston 72 to urge the later toward partition 16. Additionally, that portion of the slide valve between annular grooves 73 and 75 severs communication between line and conduit 44 and 48. Therefore, it may be seen that exhausting or draining one end of the cylinder and applying pressure to the piston 72 from the other end results in urging the piston 72 toward the end of the cylinder not having fluid therein.

Further, it is to be assumed that the guides 90 are at or adjacent one end of the grooves 88. Under the impetus of the hydraulic or pneumatic force being applied to the piston 72 it slides on one shaft 74 toward the drained end of the cylinder 40 but at the same time under the control of guides 90, received in grooves 88, the piston 72 is rotated a predetermined degree depending on the angular configuration of the grooves 88. As the piston slides and rotates the guides are engaged by the gates 94 to open the latter. When the piston 72 has moved a sufficient distance the gates are released to close, restricting, as a result, the piston to one direction of rotation.

Before the piston 72 reaches the limit of its path of travel in one direction it closes outlet or exhaust 42 and renders trapped in the end of the cylinder 40 adjacent partition 16 the remaining hydraulic fluid. As a result a cushion is formed for the piston 72 to ease the shock thereof. Further, in the event the system is under pneumatic pressure, the piston 72 strikes shock absorber 81 and one half of a complete cycle of operation is completed.

The second half follows when solenoid 60 is de-energized. As a result spring 70 urges the slide 34 to the initial assumed position and those lines and conduits originally assumed open are again open and in communication with each other and those opened and rendered in communication with each other when solenoid 60 was energized are closed. As a result the end of the cylinder 40 adjacent end cap 14 is being drained of fluid and the end adjacent partition 16 is having pressure exerted therein. The piston 72 is being urged toward end cap 14. However, the piston 72 is prevented from rotating back over its original course due to the fact that the sides 95 of gates 94 strike guides 90 and therefore the groove 88 just traversed is rendered closed. As a result the piston is urged to rotate in the original direction although sliding in the opposite direction. Sliding of the piston results in another gate 94 being opened and closed rendering another groove 88 closed against reverse rotations. It may be seen that the piston has traveled substantially one half the distance from one end of a groove 88 to the other. Again the piston 72 renders closed outlet line 44 and severs communication between this line and conduit 48. The purpose being to again form a shock absorbing cushion for the piston 72. When the piston is again adjacent cap 14 a complete cycle of operation is completed.

It is to be understood that the sliding and rotation of one piston is rotatably transmitted to shaft 74. This shaft further transmits the rotation to differential 20 resulting in rotating it and the driven shaft 22 in one direction. Actuation of the other piston 72 results in rotating shaft 22 in the opposite direction.

The arcuate configuration of the grooves 88 can be so arranged and designed to permit a great variety of cycles in a 360° path of travel. In other words the end of one groove 88 may be spaced from the end of another 36°, 18° or 72°.

Further the solenoids 60 may have substituted therefore hydraulic or pneumatic pistons resulting in the entire impulse motor being hydraulically or pneumatically actuated.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A bi-directional impulse motor comprising a body having a fluid porting and conduit system therein; a pair of reciprocable, but non-rotating, mechanisms in the body between the inlet and outlet of said system that controls the flow of fluid therein; a pair of reciprocable and rotatable driving mechanisms in the body, each driving mechanism being between a corresponding reciprocable mechanism and outlet of said system, that is fluid actuated when each corresponding reciprocable mechanism is actuated; each of said driving mechanisms being rotatable in only one direction, but one driving mechanism being rotatable in a direction opposite to the other; and a driven mechanism in said body common to both driving mechanisms that is actuated by each of said driving mechanisms that converts the reciprocable and rotary motion of said driving mechanisms into only rotary motion.

2. A bi-directional impulse motor comprising a body having a fluid porting and conduit system therein; a pair of reciprocable, but non-rotating, mechanisms in the body between the inlet and outlet of said system that controls the flow of fluid therein; a pair of reciprocable and rotatable driving mechanisms in the body, each driving mechanism being between a corresponding reciprocable mechanism and outlet of said system, that is fluid actuated when said reciprocable mechanism is actuated; each of said driving mechanisms being rotatable in only one direction but one driving mechanism being rotatable in a direction opposite to the other; a driven assembly, in said body, common to both driving mechanisms that is actuated by each of said driving mechanisms to convert the reciprocable and rotary motion of said driving mechanism into only rotary motion; structure formed in each of said driving mechanisms; means on said body that is received in said structure that guides the rotation of said driving mechanism; and elements on said driving mechanisms and engaged by said means that limits the rotation of said driving mechanisms to one direction.

3. In an impulse motor having a body, a fluid porting and conduit system in said body; guides in said body; a reciprocable and rotatable member in said body, that is fluid actuated, comprising a cylindrical piston; said piston having a series of intersecting grooves therein that receive said guides that control the rotation of said piston; and spring loaded and swingable structure on said piston located at the point of intersect of said grooves that engages said guides and admits the latter to the next adjoining groove; but restricts reverse rotation; said structure having a portion of its configuration that is complementary to the shape of the grooves.

References Cited in the file of this patent

UNITED STATES PATENTS

| | | |
|---|---|---|
| 582,244 | Tuckfield | May 11, 1897 |
| 1,005,763 | Adams | Oct. 10, 1911 |
| 1,470,462 | Maiden | Oct. 9, 1923 |
| 1,561,826 | Bremer | Nov. 17, 1925 |
| 1,801,633 | MacKirdy | Apr. 21, 1931 |
| 2,030,986 | Havill | Feb. 18, 1936 |
| 2,258,585 | Hedene | Oct. 14, 1941 |
| 1,423,957 | Amtsberg | July 15, 1947 |
| 2,431,187 | Meyers | Nov. 18, 1947 |
| 2,466,604 | MacMillin | Apr. 5, 1949 |
| 2,540,347 | Pounds | Feb. 6, 1951 |
| 2,597,420 | Westbury | May 20, 1952 |
| 2,694,994 | Weymouth | Nov. 23, 1954 |